United States Patent
Gulati et al.

(10) Patent No.: US 9,924,522 B2
(45) Date of Patent: *Mar. 20, 2018

(54) METHOD FOR SELECTING STATE OF A RECONFIGURABLE ANTENNA IN A COMMUNICATION SYSTEM VIA MACHINE LEARNING

(71) Applicant: Drexel University, Philadelphia, PA (US)

(72) Inventors: Nikhil Gulati, Philadelphia, PA (US); David Gonzalez, Annandale, NJ (US); Kapil R. Dandekar, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 122 days.

This patent is subject to a terminal disclaimer.

(21) Appl. No.: 14/867,801

(22) Filed: Sep. 28, 2015

(65) Prior Publication Data

US 2016/0021671 A1 Jan. 21, 2016

Related U.S. Application Data

(63) Continuation of application No. 14/565,665, filed on Dec. 10, 2014, now Pat. No. 9,179,470, which is a (Continued)

(51) Int. Cl.
*H04B 1/44* (2006.01)
*H04W 72/08* (2009.01)
(Continued)

(52) U.S. Cl.
CPC .......... *H04W 72/082* (2013.01); *H01Q 1/007* (2013.01); *H01Q 13/20* (2013.01);
(Continued)

(58) Field of Classification Search
CPC ...... H04B 1/44; H04B 7/0417; H04B 7/0626; H01Q 1/007; H01Q 13/20
See application file for complete search history.

(56) References Cited

U.S. PATENT DOCUMENTS 7,372,830 B2 5/2008 Jung et al.
7,453,947 B2 11/2008 Kim et al.
(Continued)

FOREIGN PATENT DOCUMENTS

WO WO 2008/129114 10/2008
WO WO 2010/085722 7/2010
WO WO 2010/094132 8/2010

OTHER PUBLICATIONS

Anantharam, et al., "Asymptotically Efficient Allocation Rules for the Multi-Armed Bandit Problem With Multiple Plays-Part 1 : I I D Rewards", IEEE Transactions on Automatic Control, Nov. 1987, 32(11), 968-976.

(Continued)

*Primary Examiner* — Tuan Pham
(74) *Attorney, Agent, or Firm* — Baker & Hostetler LLP (57) ABSTRACT

A method for selecting the state of a reconfigurable antenna installed at either the receiver or transmitter of a communication system is provided. The proposed method uses online learning algorithm based on the theory of multi-armed bandit to perform antenna state selection. The selection technique utilizes the Post-Processing Signal-to-Noise Ratio (PPSNR) as a reward metric and maximizes the long-term average reward over time. The performance of the learning based selection technique is empirically evaluated using wireless channel data. The data is collected in an indoor environment using a 2×2 MIMO OFDM system employing highly directional metamaterial Reconfigurable Leaky Wave Antennas. The learning based selection technique shows
(Continued)

Node positions on the 5th floor of the Drexel University Bossone Research Center.

performance improvements in terms of average PPSNR and regret over conventional heuristic policies.

8 Claims, 4 Drawing Sheets

Related U.S. Application Data continuation of application No. 13/606,843, filed on Sep. 7, 2012, now Pat. No. 8,942,659.

(60) Provisional application No. 61/532,131, filed on Sep. 8, 2011.

(51) Int. Cl.
  *H01Q 1/00* (2006.01)
  *H01Q 13/20* (2006.01)
  *H04W 24/02* (2009.01)
  *H04B 7/0417* (2017.01)
  *H04B 7/06* (2006.01)

(52) U.S. Cl.
  CPC ............. *H04B 1/44* (2013.01); *H04B 7/0417* (2013.01); *H04B 7/0626* (2013.01); *H04W 24/02* (2013.01); *H04W 72/085* (2013.01)

(56) References Cited

U.S. PATENT DOCUMENTS

| | | | |
|---|---|---|---|
| 7,469,152 B2 | 12/2008 | Cetiner et al. | |
| 7,539,458 B2 | 5/2009 | Jafarkhani et al. | |
| 8,942,659 B2* | 1/2015 | Gulati ...................... | H04B 1/44 455/130 |
| 9,179,470 B2* | 11/2015 | Gulati ...................... | H04B 1/44 |
| 2007/0253464 A1* | 11/2007 | Hori ........................ | H04B 1/707 375/130 |
| 2009/0140920 A1 | 6/2009 | Frigon et al. | |
| 2009/0268834 A1* | 10/2009 | Ariyavisitakul ..... | H04B 7/0854 375/262 |
| 2010/0054356 A1 | 3/2010 | Keerthi | |
| 2010/0272204 A1* | 10/2010 | Fazel .................. | H04B 7/0608 375/267 |
| 2011/0116569 A1 | 5/2011 | Vaughan et al. | |

OTHER PUBLICATIONS

Auer, et al., "Finite-Time Analysis of the Multi-Armed Bandit Problem", Machine Learning, May-Jun. 2002, 47(2-3), 235-256.

Bougard, et al., "SmartMIMO: An Energy-Aware Adaptive MIMO-OFDM Radio Link Control for Next-Generation Wireless Local Area Networks", EURASIP Journal on Wireless Communications and Networking, Jul. 2007, 1-15.

Daniels, et al., "Adaptation in Convolutionally Coded MIMO-OFDM Wireless Systems Through Supervised Learning and SNR Ordering", IEEE Transaction on Vehicular Technology, Jan. 2010, 59(1), 114-126.

Diao, et al., "Fading-Aware Packet Scheduling Algorithm in OFDM-MIMO Systems", EURASIP Journal on Wireless Communications and Networking, May 2007, 1-10.

Eslami, et al., "Reduced Overhead Training for Multi Reconfigurable Antennas With Beam-Tilting Capability", IEEE Transactions on Wireless Communications, Dec. 2010, 9(12), 3810-3821.

Gai, et al., "Learning Multi-User Channel Allocations in Cognitive Radio Networks: A Combinatorial Multi-Armed Bandit Formulation", 2010 IEEE Symposium on New Frontiers in Dynamic Spectrum, IEEE, Apr. 6-9, 2010, 1-9.

Grau, et al., "A Reconfigurable Multiple-Input Multiple-Output Communication System", IEEE Transactions on Wireless Communications, May 2008, 7(5), 1719- 1733.

Gulati, et al., "Learning Algorithm for Reconfigurable Antenna State Selection", 2012 Radio and Wireless Symposium (RWS), IEEE, Jan. 15-18, 2012, 31-34.

Lai, et al., "Asymptotically Efficient Adaptive Allocation Rules", Advances in Applied Mathematics, Mar. 1985, 6(1), 4-22.

Liu et al., "Transmit Antenna Subset Selection for MIMO-OFDM Wireless Communication Systems", http://www.mit.edu/~wqm/Papers/Malik_ietsacc07.pdf,2007, 1-4.

MATLAB Rice University WARP project, "Wireless Open-Access Research Platform", In European Signal Processing Conference, 2006, 4, http://warp.rice.edu.

Piazza, et al., "Performance Improvement of a Wideband MIMO System by Using Two-Port RLWA", Antennas and Wireless Propagation Letters, IEEE, Jul. 2009, 8, 830-834.

Piazza, et al., "Two Port Reconfigurable CRLH Leaky Wave Antenna With Improved Impedance Matching and Beam Tuning", 3rd European Conference on Antennas and Propagation, 2009, EuCAP 2009, IEEE, Mar. 23-27, 2009, 2046-2049.

Sriram, et al., "Transmit Optimization in OFDM-MIMO Systems", Thesis-Department of Electronics Engineering Madras Institute of Technology—Anna University—Chennai—600 044, Apr. 2004, 58 pages.

Yun, et al., "Reinforcement Learning for Link Adaptation in MIMO-OFDM Wireless Systems", GLOBE COM 2010,2010 IEEE Global Telecommunications Conference, Dec. 2010, 1-5.

Zivkovic, et al., "Preamble-based SNR Estimation Algorithm for Wireless MIMO OFDM Systems", ISWCS'09 Proceedings of the 6th international conference on Symposium on Wireless Communication Systems, 2009, 96-100.

* cited by examiner

Figure 1

Fig. 2. Measured radiation patterns for port 1 (Gain ≈ $-3dB$)

Fig. 3. Average reward for each algorithm for the designated links

Fig. 4. Node positions on the 5th floor of the Drexel University Bossone Research Center.

Fig. 5. Normalized Regret $\frac{Regret(n)}{n}$ vs packet number for all links

Fig. 6. Empirical CDF of Post-Processing SNR averaged across all links

METHOD FOR SELECTING STATE OF A RECONFIGURABLE ANTENNA IN A COMMUNICATION SYSTEM VIA MACHINE LEARNING

CROSS-REFERENCE TO RELATED APPLICATIONS

The present application is a continuation application of U.S. patent application Ser. No. 14/565,665, filed Dec. 10, 2014, which is, in turn, a continuation application of U.S. patent application Ser. No. 13/606,843, filed Sep. 7, 2012, now U.S. Pat. No. 8,942,659, which claims priority under 35 U.S.C. § 119(e) to U.S. Provisional Patent Application No. 61/532,131 filed Sep. 8, 2011. The contents of these patent applications are hereby incorporated by reference in their entireties.

STATEMENT OF FEDERALLY SPONSORED RESEARCH

This invention was made with government support under Grant No. 0916480 awarded by the National Science Foundation. The government has certain rights in the invention.

TECHNICAL FIELD

The present invention relates generally to the field of multi-element antenna systems. Specifically, the present invention relates to methods for efficiently using multi-element reconfigurable antennas in MIMO systems.

BACKGROUND

In recent years, studies have shown that reconfigurable antennas can offer additional performance gains in Multiple Input Multiple Output (MIMO) systems by increasing the channel capacity, diversity order and even have been shown to perform well in the low SNR regimes. These reconfigurable antennas are capable of generating multiple uncorrelated channel realizations by changing their electrical and radiation properties and are gradually making their way into commercial wireless systems. The key to effectively utilizing the reconfigurability offered by these antennas is to select a state that provides improvement in received SNR, throughput or channel capacity (referred to as "optimal state" herein) among all the states for a given wireless environment.

Reconfigurable antennas can be employed either at the transmitter or the receiver, or at both ends of the RF chain. This flexibility can create a large search space in order to find an optimal state for communication. The key bottleneck to exploit the full potential of reconfigurable antennas is the requirement of additional training to obtain the channel state information corresponding to each beam pattern and/or the combination thereof at the receiver and transmitter. Moreover, the effect of node mobility to a different location, changes in physical antenna orientation, and the dynamic nature of the wireless channel can render previously found "optimal" states suboptimal over time. This makes it important for a wireless system to employ a learning algorithm to find the new optimal states and to maintain the highest possible SNR.

In order to be effective, an online learning algorithm for antenna state selection (also referred to herein interchangeably as "selection technique") must overcome certain challenges, including:

1) Optimal antenna state for each wireless link (between a single transmitter and a receiver location) is unknown a priori. Moreover, each wireless link may have a different optimal state. A selection technique should be able to learn and find the optimal state for a given link.

2) For a given wireless link, there might be several states which are near optimal over time, based on channel conditions and multi-path propagation. A selection technique should provide a policy to balance between exploiting a known successful state and exploring other available states to account for dynamic behavior of the channel.

3) For the purpose of real-time implementation in a practical wireless system, a selection technique must employ simple metrics that can be extracted from the channel without large overhead or requiring extensive feedback data.

4) The selection technique should require reduced training or reduced channel state information to keep the overhead low in a practical wireless system.

Previous work related to state selection is based on estimating channel response of each antenna state which required changing the standard OFDM frame format. However, as the number of states increases, the scheme becomes impractical. See, e.g., A. Grau, H. Jafarkhani, and F. De Flavis, "A reconfigurable multiple-input multiple-output communication system," *IEEE Transactions on Wireless Communications*, vol. 7, no. 5, pp. 1719-1733, 2008. Selection techniques using second order channel statistics and average SNR information have also been proposed by D. Piazza, M. D'Amico, and K. Dandekar in "Performance improvement of a wideband MIMO system by using two-port RLWA," *Antennas and Wireless Propagation Letters, IEEE*, vol. 8, pp. 830-834, 2009. Further H. Eslami, C. Sukumar, D. Rodrigo, S. Mopidevi, A. Eltawil, L. Jofre, and B. Cetiner, proposed training schemes with reduced overhead and compared these to exhaustive search techniques in "Reduced overhead training for multi reconfigurable antennas with beam-tilting capability," *IEEE Transactions on Wireless Communications*, vol. 9, pp. 3810-3821, 2010. Though some of these techniques were successful in showing the benefits of multi-state selection and motivated the need for a selection algorithm, none solved the challenges mentioned above and were not truly adaptive in operation and required additional parameter tuning to perform optimally. Previous work in learning for cognitive radios has primarily been focused on link adaptation. See, e.g., R. Daniels, C. Caramanis, and R. Heath, "Adaptation in convolutionally coded MIMO-OFDM wireless systems through supervised learning and SNR ordering," *IEEE Transaction on Vehicular Technology*, vol. 59, no. 1, pp. 114-126, 2010, and S. Yun and C. Caramanis, "Reinforcement learning for link adaptation in MIMO-OFDM wireless systems," in *GLOBECOM 2010, 2010 IEEE Global Telecommunications Conference*, December 2010, pp. 1-5 and channel allocation for dynamic spectrum access in Y. Gai, B. Krishnamachari, and R. Jain, "Learning multi-user channel allocations in cognitive radio networks: a combinatorial multi-armed bandit formulation," in 2010 *IEEE Symposium on New Frontiers in Dynamic Spectrum*, IEEE, 2010, pp. 1-9.

It is desired to develop learning algorithms for antenna state selection to address the above challenges to improve the performance of wireless systems and to investigate the feasibility of implementing such algorithms in a practical wireless system. The present invention addresses these needs in the art.

SUMMARY

The present invention addresses the above-mentioned challenges in the art by formulating the antenna state selection as a multi-armed bandit problem. The multi-armed bandit problem described by T. L. Lai and H. Robbins, "Asymptotically efficient adaptive allocation rules," *Advances in Applied Mathematics*, vol. 6, no. 1, pp. 4-22, 1985; V. Anantharam, P. Varaiya, and J. Walrand, "Asymptotically efficient allocation rules for the multi-armed bandit problem with multiple plays-part I: I.I.D rewards," *IEEE Transactions on Automatic Control*, vol. 32, no. 11, pp. 968-976, 1987; and P. Auer, N. Cesa-Bianchi, and P. Fischer, "Finite-time analysis of the multi-armed bandit problem," *Machine learning*, vol. 47, no. 2, pp. 235-256, 2002, is a fundamental mathematical framework for learning unknown variables. In its classic form, there are N independent arms with a single player playing arm i (i=1, . . . N). Each play of a single arm yields random rewards which are i.i.d with a distribution of unknown mean. The goal is to design a policy to play one arm at each time sequentially to maximize the total expected reward in the long run. T. L. Lai and H. Robbins in "Asymptotically efficient adaptive allocation rules," *Advances in Applied Mathematics*, vol. 6, no. 1, pp. 4-22, 1985, studied the non-Bayesian formulation and provided a performance measure of an arm selection policy referred to as regret or cost of learning. Regret is defined as the difference in the expected reward gained by always selecting the optimal choice and the reward obtained by a given policy. Since the best arm cannot always be identified in most cases using a finite number of prior observations, the player will always have to keep learning and the regret will grow over time. Then, the regret of a policy after n selections is given by:

$$\mu^* n - \mu_i \sum_{i=1}^{N} E[T_i(n)]$$

where:

$$\mu^* = \max_{1 \leq i \leq N} \mu_i$$

$\mu^*$ is the average reward for the optimal arm, $\mu_i$ is the average reward for arm i, n is number of total trials, $E[\bullet]$ is the expectation operator and $T_i$ is the number of times arm i has been sampled. It has been shown by Lai and Robbins that the minimum rate at which regret grows is of logarithmic order under certain regularity conditions. The algorithm of the invention processes the received data to select the antenna state that minimizes the regret over time.

In accordance with an exemplary embodiment, the method of selecting an antenna state for a multi-element reconfigurable transmitter and/or receiver antenna (e.g., a type of reconfigurable leaky wave antenna) in accordance with the invention includes the steps of providing a learning algorithm that optimizes a wireless link between at least one reconfigurable transmitter antenna and at least one reconfigurable receiver antenna over time over different antenna array states and setting the antenna state for the transmitter and/or a receiver antenna based at least in part on the antenna states determined by the learning algorithm to lead to an optimized wireless link between the at least one reconfigurable transmitter antenna and the at least one reconfigurable receiver antenna over time. In an illustrated embodiment, the learning algorithm formulates selection of an antenna as a multi-armed bandit problem for learning the wireless channel conditions of the wireless link so as to maximize the wireless link between the at least one reconfigurable transmitter antenna and the at least one reconfigurable receiver antenna over time. In this exemplary embodiment, the learning algorithm implements an arm selection policy referred to as regret defined as the difference in an expected reward gained by always selecting a path with an optimal wireless link and a path that leads to an optimized wireless link over time. The learning algorithm processes the received data to select the antenna array configuration that minimizes the regret over time. Thus, the transmission data is first collected and then later processed through the learning algorithm to benchmark performance. When the data is replayed on the computer implementing the learning algorithm, the learning algorithm is used to continuously make decisions until all of the data is processed. When this selection technique is deployed on a live wireless device and live transmission data is transmitted, the learning algorithm is active at every transmission and selects the state of the antenna system per transmission or per data packet. Whether the live data transmission is emulated or actual live data is sent through the wireless device, the techniques of the invention will always be active and will make sequential decisions. The wireless link is optimized by optimizing signal to noise ratio, channel capacity, or link throughput.

The proposed method is adaptive in nature and can adapt to changes in wireless channel conditions, wireless node mobility and antenna orientation. The proposed method also is less computationally intensive and has low feedback requirements for practical implementation.

DETAILED DESCRIPTION OF ILLUSTRATIVE EMBODIMENTS

A detailed description of illustrative embodiments of the present invention will now follow with reference to FIGS. 1-6. Although this description provides a detailed example of possible implementations of the present invention, it should be noted that these details are intended to be exemplary and in no way delimit the scope of the invention.

Learning Algorithm

The methods described herein are influenced by the work done by P. Auer, N. Cesa-Bianchi, and P. Fischer as reported in "Finite-time analysis of the multi-armed bandit problem," *Machine learning*, vol. 47, no. 2, pp. 235-256, 2002, where arms have non-negative rewards that are i.i.d over time with an arbitrary unparameterized distribution. The setup is considered where there is a single transmitter and M wireless receiver nodes and both the transmitter and the receivers employ the reconfigurable antennas. The transmitter has a fixed antenna state and the receivers can select from N available antenna states. This reduces the problem to selecting an antenna state only at the receiver end where each receiver can select state i independently. The decision is made at every packet reception n to select the state to be used for the next reception. If a receiver node selects a state i and it is assumed that the transmission is successful, a random reward is achieved which can be denoted as $R_i$ (n). Without loss of generality, $R_i$ (n) is normalized as $R_i$ (n) $\in[0, 1]$. When a receiver selects a state i, the value of $R_i$ (n) is only observed by that receiver and the decision is made only based on locally observed history.

The selection technique described herein is based on the deterministic policy UCB1 given by Auer, Cesa-Bianchi, and Fischer. To implement this policy, the average of all the reward values observed for state i up to the current packet n denoted as $R_i$ (n) and the number of times state i has been played, $n_i$ (n) are stored. The UCB1 policy is shown below as Algorithm I.

---
Algorithm 1 UCB1 Policy (P. Auer, N. Cesa-Bianchi, and P. Fischer, "Finite-time analysis of the multi-armed bandit problem," *Machine learning*, vol. 47, no. 2, pp. 235-256, 2002)

// Initialization
$n_i, \overline{R}_i \leftarrow 0$
Play each arm at least once and update $n_i$, $R_i$ accordingly.
// Main Loop
while 1 do
   Play arm i that maximizes $$\overline{R}_i + \sqrt{\frac{2\ln(n)}{n_i}} \tag{1}$$

Update $n_i$, $R_i$ for arm i
end while

---

The $\epsilon$-GREEDY policy is also implemented, which is a randomized policy, and the UCB1-Tuned policy of Auer, Cesa-Bianchi, and Fischer is implemented, which has been shown to work better for practical purposes. In the $\epsilon$-GREEDY policy, the arm with current highest average is selected with probability 1–$\epsilon$ and a random arm is selected with probability $\epsilon$. UCB1-Tuned is a fine tuned version of UCB1 policy which accounts for the variance measured independently across arms. In this policy, the upper confidence bound of UCB1 policy is replaced by:

$$\sqrt{\frac{\ln(n)}{n_t} \min\left(\frac{1}{4}, V_i(n_t)\right)} \tag{2}$$

where $V_i$ is defined as:

$$V_i(s) \equiv \left(\frac{1}{s}\sum R_{is}^2\right) - R_{is}^2 + \sqrt{\frac{2\ln(t)}{s}} \tag{3}$$

when arm i has been played s times during the first t plays. Another variant of UCB1 policy known as UCB1-Normal is also implemented where it is assumed that the rewards are drawn from a normal distribution. The UCB1-Normal policy proposed in Auer, Cesa-Bianchi, and Fischer is given as Algorithm 2 below.

---
Algorithm 2 UCB1-Normal Policy (P. Auer, N. Cesa-Bianchi, and P. Fischer, "Finite-time analysis of the multi-armed bandit problem," *Machine learning*, vol. 47, no. 2, pp. 235-256, 2002)

// Initialization
$n_i, \overline{R}_i \leftarrow 0$
// Main Loop
while 1 do
   Play the machine which has been played less than 8logn times
   Otherwise, play arm i that maximizes $$\overline{R}_i + \sqrt{16 \frac{q_i - n_i R_i^2}{n_i - 1} \frac{\ln(n-1)}{n_i}} \tag{4}$$

Update $n_i$, $R_i$ for arm i
end while

--- where $q_i$ is the sum of squared rewards for arm i.

Exhaustive Search With Periodic Training (ESPT)

We compare the proposed multi-armed bandit algorithms with periodic training scheme which requires exhaustive search to acquire channel state information corresponding to each antenna state. In the periodic training scheme of an exemplary embodiment, each receiver goes through a training phase where each antenna state is activated in sequence by a processor implementing the ESPT scheme and the reward from each transmission is stored in an associated memory. The amount of training is defined by the training period T. Once, the training phase is over, the receiver selects the state with maximum average during the training phase and continues receiving on that state. The training is repeated every F packets, which is defined as the frequency of the training. This can be viewed as the process of consecutive exploration and exploitation, except that the duration of the exploration and exploitation is fixed and exploration occurs across all the states.

Reconfigurable Leaky Wave Antennas

Figure 1:
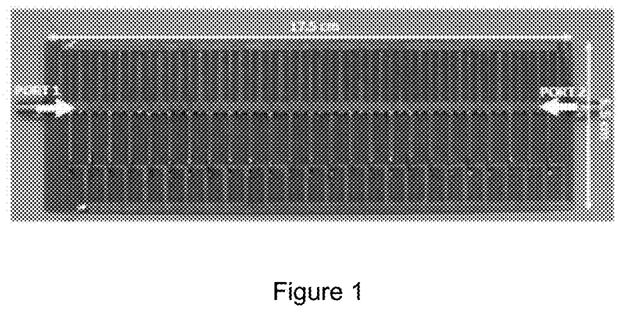
FIG. 1 is a composite right/left-handed two port reconfigurable leaky wave antenna composed of 25 cascaded metamaterial unit cells.

The Reconfigurable Leaky Wave Antenna (RLWA) is a two port antenna array designed to electronically steer two highly directional independent beams over a wide angular range. Initially proposed by the authors in D. Piazza, D. Michele, and K. Dandekar, "Two port reconfigurable CRLH leaky wave antenna with improved impedance matching and beam tuning," in 3$^{rd}$ *European Conference on Antennas and Propagation*, 2009, EuCAP 2009, IEEE, 2009, pp. 2046-2049, the embodiment shown in FIG. 1 is a composite right/left-handed leaky wave antenna composed of 25 cascaded metamaterial unit cells. See also, D. Piazza, M. D'Amico, and K. Dandekar, "Performance improvement of a wideband MIMO system by using two-port RLWA," *Antennas and Wireless Propagation Letters, IEEE*, vol. 8, pp. 830-834, 2009. Moreover, the application of various combinations of bias voltages "S" and "SH" controls the beam direction allowing for symmetrical steering of the two radiation beams at the two ports over a 140° range.

Figure 2:
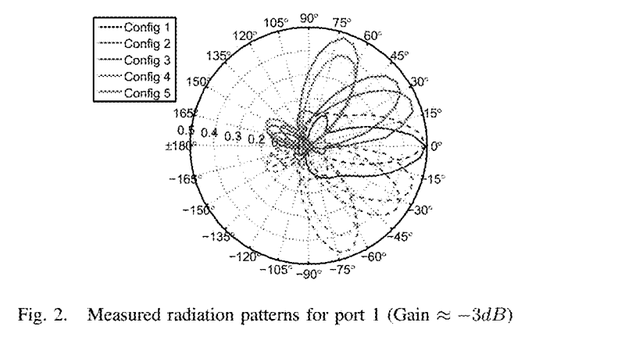
FIG. 2 shows the measured radiation patterns for selected states and their corresponding bias voltages at port 1 (Gain ~-3 dB).

In order to characterize the effect of beam direction on the efficacy of a wireless system with RLWAs deployed at both ends of a link, a subset of states was selected to allow the beam to steer over a range of 140° in the elevation plane. FIG. 2 shows the measured radiation patterns for the selected states for port 1 and their corresponding bias voltages (Gain ~−3 dB).

Experimental Setup and Results

Figure 4:
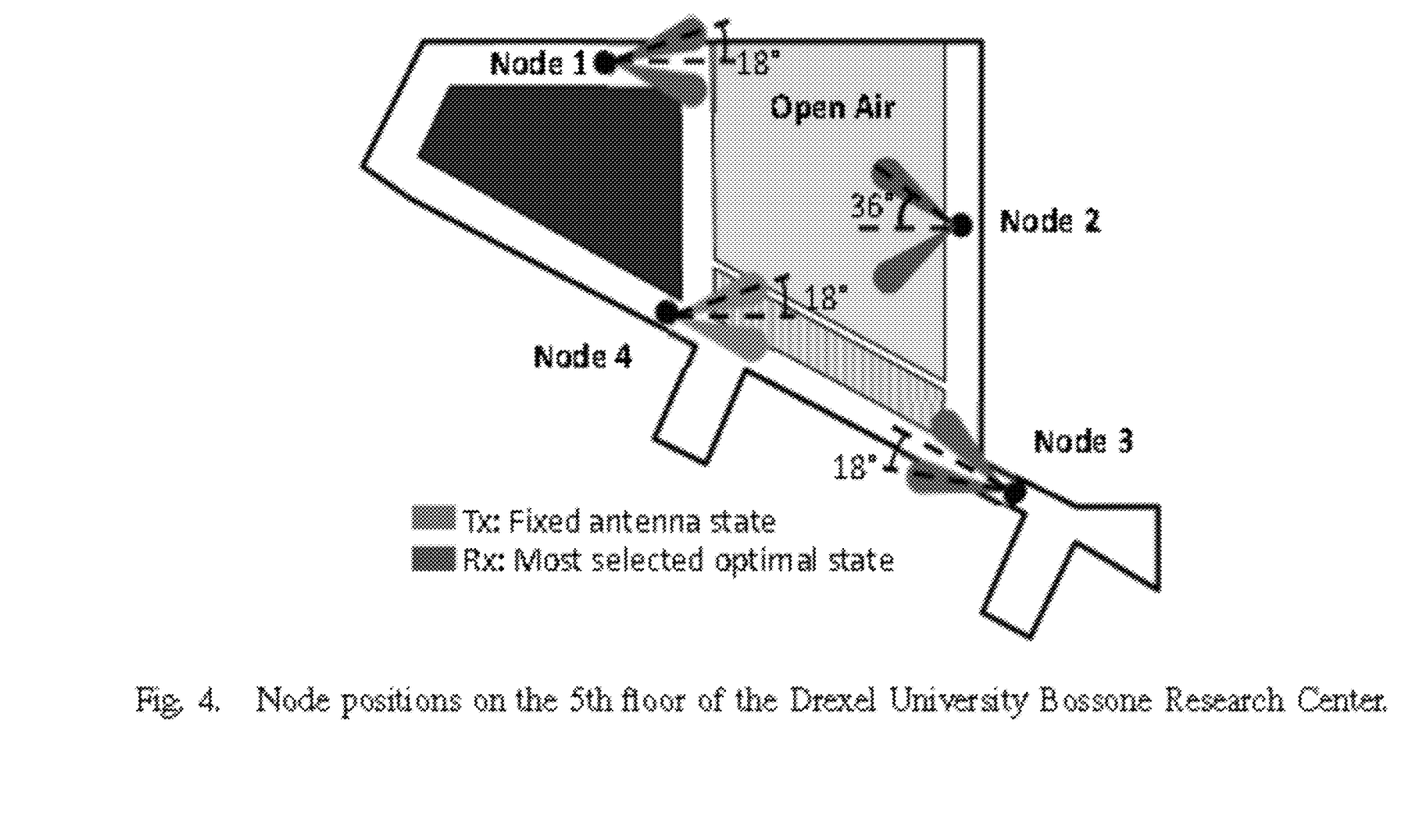
FIG. 4 shows the node positions in an experimental arrangement using four distributed WARP nodes.

In their experiments, the inventors used the Wireless Open Access Research Platform (WARP), an FPGA-based software defined radio testbed, and WARPLab, the software development environment used to control WARP nodes from MATLAB Rice University WARP project. http://warp.rice.edu. Four WARP nodes were distributed throughout the fifth floor of the Drexel University Bossone Research Center as shown in FIG. 4. By using WARPLab, each of the nodes were centrally controlled to allow for the synchronization of the transmission and reception process and to provide control over the antenna state selected at each of the nodes. Although the nodes were controlled centrally for data collection purposes, the learning algorithm was decentralized. Specifically, no information during the learning process was shared with the transmitter. Those skilled in the art will appreciate that the WARPLab software development environment may be replaced in exemplary practical embodiments by a central processor (not shown) or a processor connected to each antenna at each transmitter/receiver (not shown) programmed to control the system nodes and to control the antenna state selected at each of the nodes in accordance with one or more of the machine learning algorithms described above. Also, a memory (not shown) associated with the central processor or with each processor associated with an antenna may be used to store the received transmission and reception data for processing by the selected machine learning algorithm.

The performance of the RLWA was evaluated in a 2×2 MIMO system with spatial multiplexing as the transmission technique. For baseline measurements, each designated WARP node transmitter broadcasted packets modulated using BPSK. For each packet transmission, the receiver nodes stored channel estimates in memory and measured the post-processing signal-to-noise ratio (PPSNR) by evaluating the error vector magnitude (EVM) of the received symbol constellations. EVM is defined as the inverse of the squared symbol estimation error. Furthermore, the antenna states for each node were switched after each packet until all 5 possible antenna states between the transmitter and receivers were tested. This process was repeated until 200 realizations were achieved for all state combinations and for each node acting as a transmitter. The beam directions in FIG. 4 correspond to the optimal state selected most often at each of the receivers when node 4 was transmitting. The algorithm described above is an online algorithm but the collected channel realizations were used corresponding to each state and the algorithm was evaluated in post-processing. This is important in order to benchmark the performance of different policies under the same channel conditions and to make sure that channel conditions do not bias the performance results.

Figure 3:
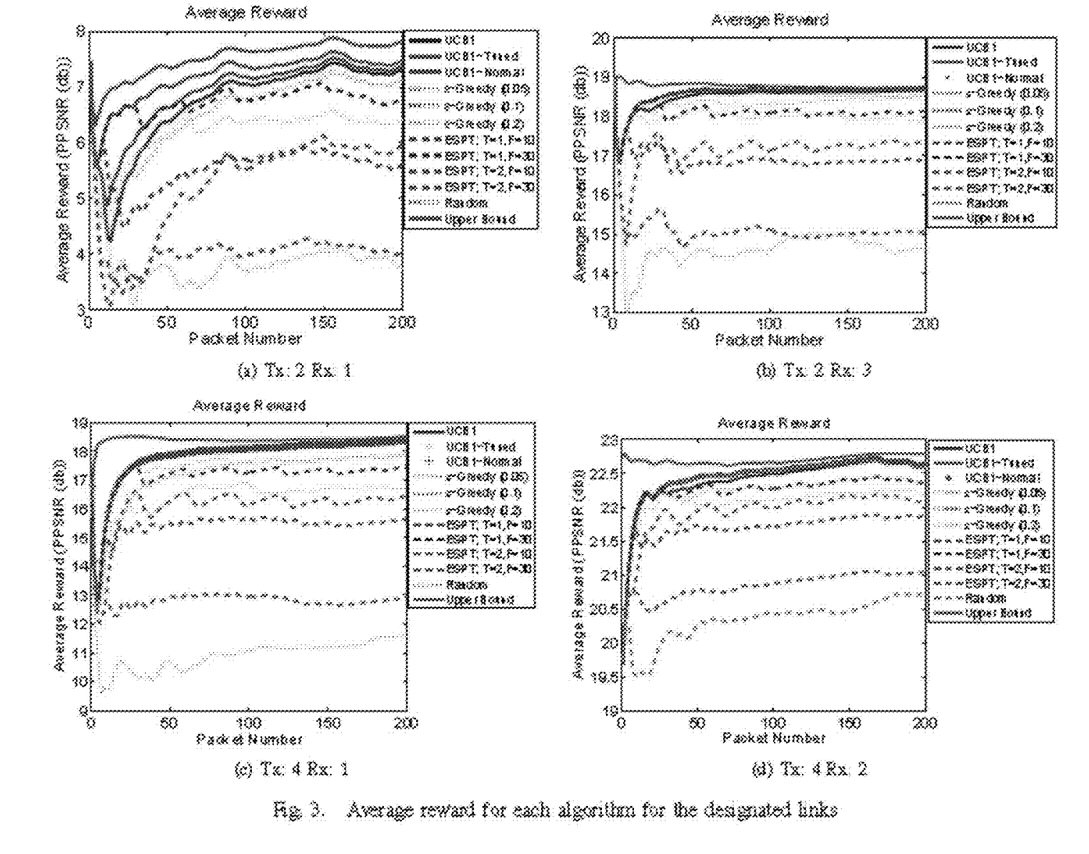
FIG. 3 shows the average reward for each algorithm for three multi-armed bandit policies (UCB1, UCB1-Tuned, UCB1-Normal, ϵ-GREEDY) and heuristic policies (ESPT, Random) verifying the empirical performance of the selection technique of the invention applied to the designated links.

The results for three multi-armed bandit policies (UCB1, UCB1-Tuned, $\epsilon$-GREEDY) are presented in FIG. 3 verifying the empirical performance of the selection technique. Each sub-figure represents the average reward achieved by all three policies for a given wireless link over 200 packets. The upper bound is defined as the reward obtained by a genie which always selected the optimal state with perfect channel knowledge of all antenna states. For most of the links in FIG. 3, it was found that both UCB1-Normal and UCB1-Tuned outperformed the other policies. UCB1-Tuned has been found to work better for practical purposes since it is not sensitive to the variance of the states. Also, $\epsilon$-GREEDY did not perform well because $\epsilon$-GREEDY explores uniformly over all states and can select sub-optimal states more often, thereby reducing the average reward. It is evident from the figure that among three instances of $\epsilon$-GREEDY policy, the instance with highest $\epsilon$ performed the worst. However, were mobile users considered in this experiment, it is possible that $\epsilon$-GREEDY policy will adapt better to substantial variations in channel condition. As, mentioned in above, one of the major drawbacks of the periodic training with exhaustive search is that the optimal training period (T) and training frequency (F) is not known a priori for each link and it is challenging to vary those parameters in the case of node mobility and high channel variability. It is observed that in the case of static receivers, by varying the T and F, performance of the exhaustive scheme is significantly affected. As the training period is reduced and training frequency is increased, sub-optimal states are used more often which reduces the average reward in the long run. It can also be seen that the exhaustive scheme with higher training period and higher frequency converges faster, but has overall reduced performance in the beginning. These results show that the ability of MAB policies to work as hands-off, semi-blind techniques without requiring parameter tuning.

Regret Analysis

Figure 5:
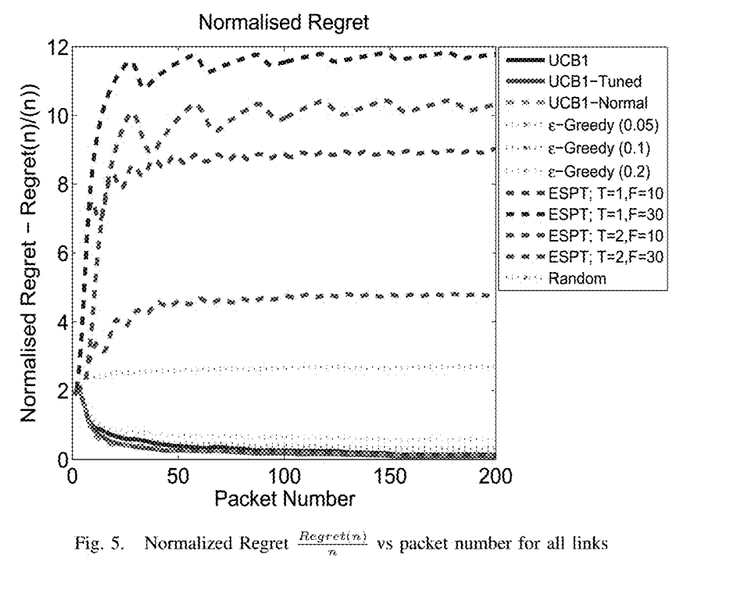
FIG. 5 illustrates normalized regret (Regret(n)/n) versus packet number for all links.
Figure 6:
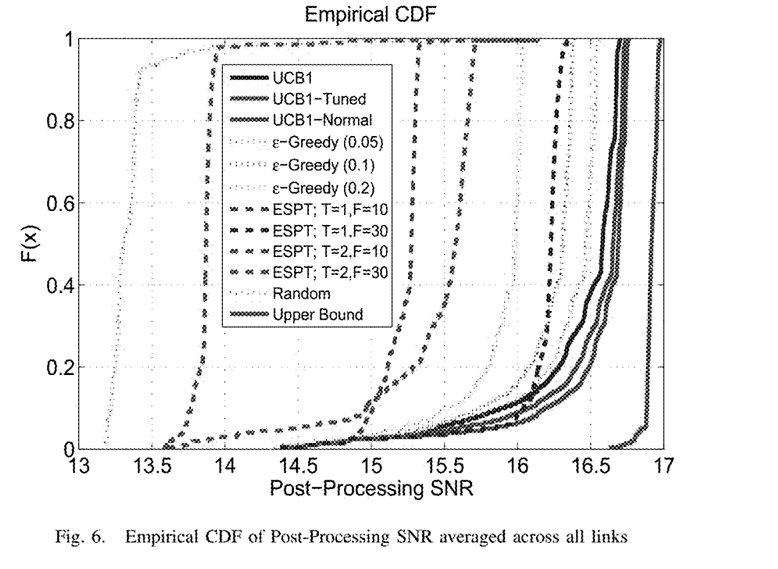
FIG. 6 illustrates empirical CDF of post-processing SNR averages across all links.

It is desired to find the optimal policy which can minimize the regret over time and provide logarithmic rate of growth of regret over time. In FIG. 5, the normalized regret is shown for all multi-armed bandit policies and also the exhaustive and random scheme. P. Auer, N. Cesa-Bianchi, and P. Fischer proved that the regret for UCB1, UCB1-Tuned, UCB1-Normal grows logarithmically in time. The $\epsilon$-GREEDY policy yields regret that is linear in time. Since, there are random policies, the regret is averaged over 200 runs, each run with 200 sequential trials for the random policies. It can be seen that the regret of all multi-armed bandit policies have very low regret as compared to the ESPT and Random selection policies. UCB1-Tuned has the least regret among the multi-armed bandit policies. FIG. 6 further shows the empirical CDF of Post-Processing SNR averaged across all links for both multi-armed bandit and heuristic policies.

The above techniques were applied to methods of selecting an antenna array state for a multi-element reconfigurable transmitter and/or receiver antenna by providing a learning algorithm such as that described above that optimizes wireless channel conditions of possible signal paths between at least one reconfigurable transmitter antenna and at least one reconfigurable receiver antenna over time over different antenna array states of the at least one reconfigurable transmitter antenna and the at least one reconfigurable receiver antenna. The antenna array states for the transmitter and/or a receiver antenna is then set based at least in part on the antenna array states determined by the learning algorithm to lead to optimized wireless channel conditions between the at least one reconfigurable transmitter antenna and the at least one reconfigurable receiver antenna over time. For example, the learning algorithm may formulate selection of an antenna array state as a multi-armed bandit problem for learning the wireless channel conditions of the possible signal paths so as to maximize wireless channel conditions between the at least one reconfigurable transmitter antenna and the at least one reconfigurable receiver antenna over time. The learning algorithm may further implement an arm selection policy to minimize regret (defined as the difference in an expected reward gained by always selecting a path with an optimal wireless channel condition and a path that leads to an optimized wireless channel condition over time). The learning algorithm processes the received data to select the antenna array state that minimizes the regret.

The methods of the invention thus incorporate a learning algorithm for antenna state selection that it is practical for use in wireless systems employing reconfigurable antennas. It has been shown empirically that the multi-armed bandit problem is a useful online learning framework for antenna state selection in a practical wireless system. For a network of four nodes employing reconfigurable antennas equipped with five states, the learning algorithm improves the received PPSNR and thereby improves the achievable throughput of the system.

While the invention has been described with reference to specific embodiments, the description is illustrative of the invention and is not to be construed as limiting the invention. Various modifications and applications may occur to those skilled in the art without departing from the spirit and scope of the invention as defined by the appended claims. For example, the methods described herein may be used in a training mode for a wireless transmission system or during an operational mode where live data is transmitted to select antenna states and configurations in real-time or near real-time.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more, or different elements, which are disclosed above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus, if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. For example, while the method of the invention is described for use with reconfigurable leaky wave antennas (RLWAs), those skilled in the art will appreciate that the claimed methods may be used with other types of reconfigurable antennas as well. Therefore, obvious substitutions now or later known to one with ordinary skill in the art are defined to be within the scope of the defined elements.

What is claimed:

1. A method of selecting an antenna array state for a multi-element reconfigurable transmitter and/or receiver antenna, comprising the steps of:
    a processor executing a learning algorithm that optimizes a wireless link between at least one reconfigurable transmitter antenna and at least one reconfigurable receiver antenna over time over different antenna array states of said at least one reconfigurable transmitter antenna and said at least one reconfigurable receiver antenna; and
    the processor setting the antenna array configuration for the transmitter and/or a receiver antenna based at least in part on the antenna array states determined by said learning algorithm to lead to an optimized wireless link between said at least one reconfigurable transmitter antenna and said at least one reconfigurable receiver antenna over time,
    wherein executing the learning algorithm includes formulating selection of an antenna array state using an online learning framework for learning at least one unknown wireless channel condition of said wireless link and selecting the antenna array state that maximizes the at least one wireless channel condition between said at least one reconfigurable transmitter antenna and said at least one reconfigurable receiver antenna over time.

2. The method of claim 1, wherein executing the learning algorithm includes providing a performance measure referred to as regret defined as the difference in an expected reward gained by always selecting a link with an optimal wireless channel condition and a path that leads to an optimized wireless channel condition over time, said learning algorithm processing received data to select the antenna array states that minimizes the regret over time.

3. The method of claim 1, wherein the wireless link is optimized by optimizing signal to noise ratio, channel capacity, or link throughput.

4. The method of claim 1, wherein the multi-element reconfigurable transmitter and/or receiver antenna comprises a type of reconfigurable leaky wave antenna.

5. The method of claim 1, wherein the learning algorithm is active at every transmission and selects the state of the antenna system per transmission or per data packet.

6. The method of claim 5, wherein executing the learning algorithm includes putting the wireless link through a training phase including selecting at every packet reception an antenna array state to be used for a next packet reception.

7. The method of claim 1, wherein executing the learning algorithm includes formulating selection of the antenna array state by learning unknown signal to noise ratios of possible signal paths between said at least one reconfigurable transmitter antenna and said at least one reconfigurable receiver antenna so as to maximize signal to noise ratio between said at least one reconfigurable transmitter antenna and said at least one reconfigurable receiver antenna over time.

8. The method of claim 1, wherein the online learning framework selects the antenna array state by solving a multi-armed bandit problem.

\* \* \* \* \*